C. L. POOL.
AUTOMATIC SIGNAL AND CONTROL FOR RAILWAYS.
APPLICATION FILED MAR. 20, 1913.
1,129,120.
Patented Feb. 23, 1915.
2 SHEETS—SHEET 1.
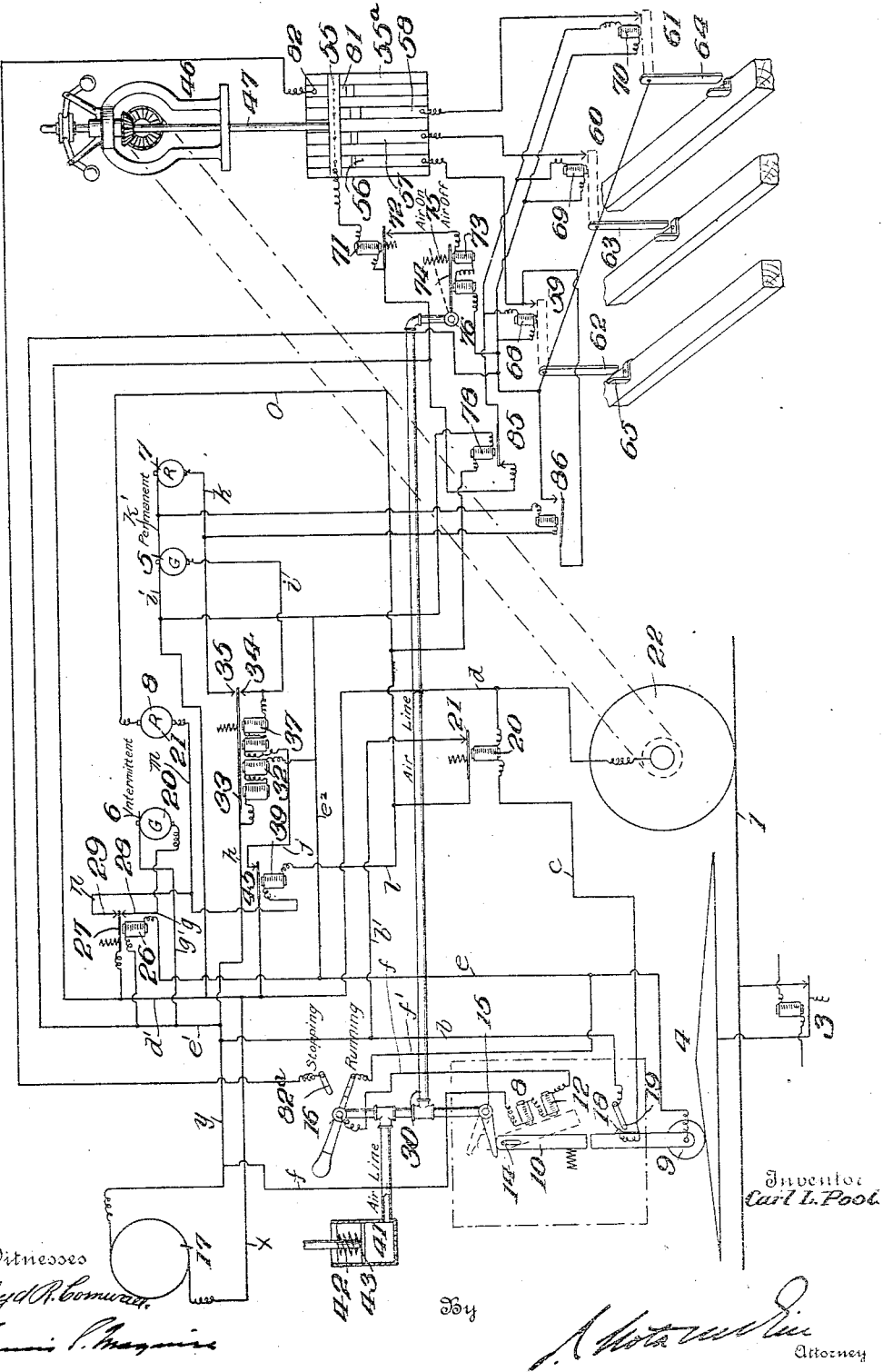
Witnesses
Inventor
Carl L. Pool
By
Attorney C. L. POOL.
AUTOMATIC SIGNAL AND CONTROL FOR RAILWAYS.
APPLICATION FILED MAR. 20, 1913.
1,129,120.
Patented Feb. 23, 1915.
2 SHEETS—SHEET 2.
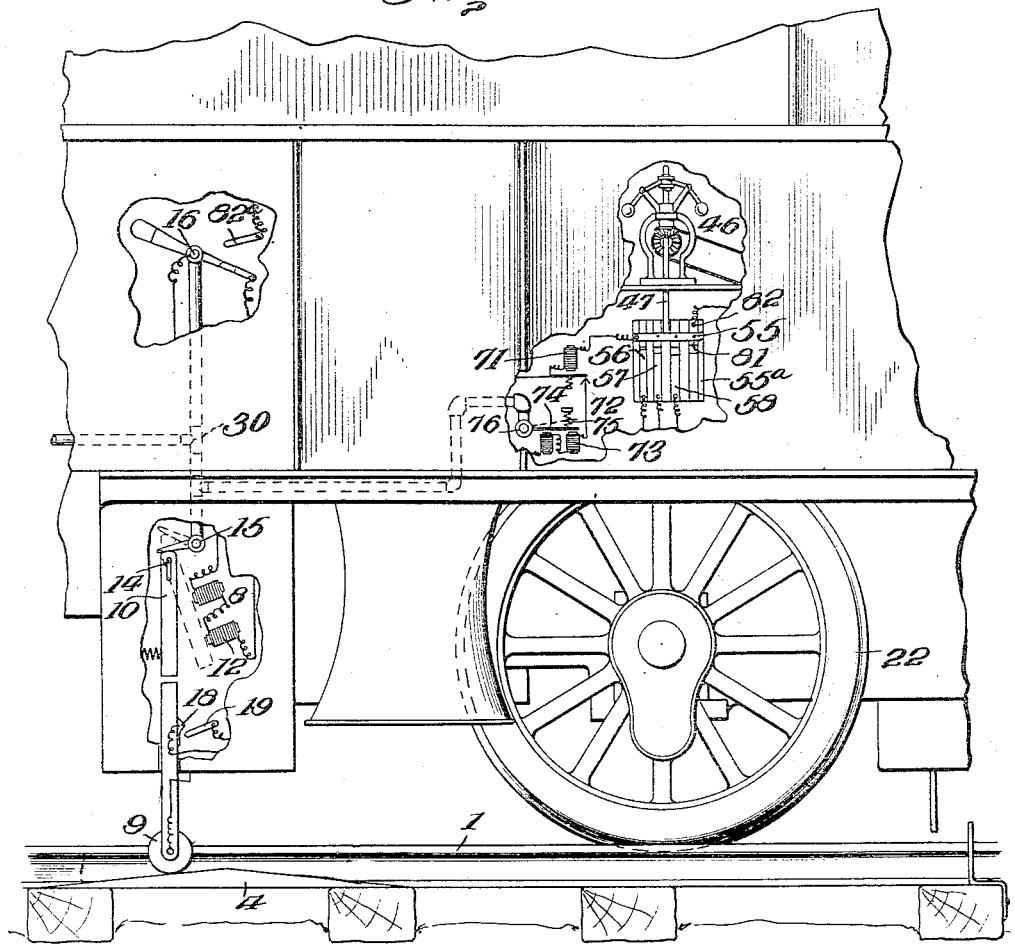
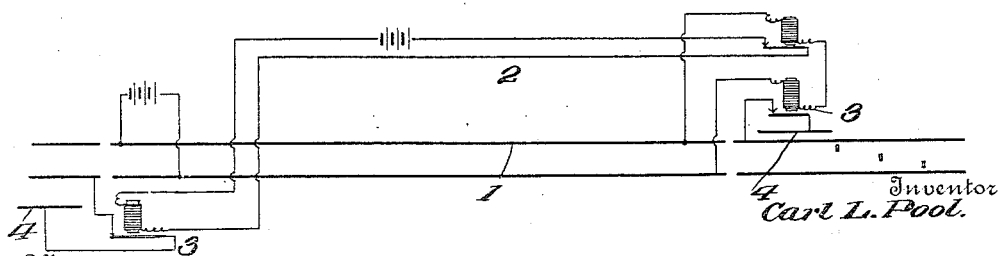

UNITED STATES PATENT OFFICE.

CARL L. POOL, OF SHERMAN, TEXAS.

AUTOMATIC SIGNAL AND CONTROL FOR RAILWAYS.

1,129,120.  Specification of Letters Patent.  Patented Feb. 23, 1915.

Application filed March 20, 1913. Serial No. 755,685.

*To all whom it may concern:*

Be it known that I, CARL L. POOL, of Sherman, in the county of Grayson and State of Texas, have invented certain new and useful Improvements in Automatic Signals and Control for Railways; and I do hereby declare the following to be a full, clear, and exact description of the invention, such as will enable others skilled in the art to which it appertains to make and use the same.

This invention relates to means for automatically arresting the travel of a locomotive or train in the event of failure of a clear track.

The primary object of this invention is to provide improved automatically-controlled signals within the cab of a locomotive for indicating to the engineer the condition of the track, whether clear or obstructed, and also when the speed-reducing means has been automatically operated.

A further object is to provide means whereby the danger signal will be constantly operated if the train continues to travel over an obstructed track, and likewise wherein the clear signal will be continuously operated when traveling over an unobstructed track.

In the accompanying drawings, Figure 1 is a diagrammatic view of one form of embodiment of my invention. Fig. 2 is a diagrammatic view of a track showing an electrically-connected block or section. Fig. 3 shows the general outline of a locomotive equipped with my present improvements, the wiring being omitted.

Referring to he drawings, Fig. 2, 1 designates a block or section of a railway track, which block is shown as comprising a closed electrical circuit 2 of known construction and arrangement, and having a circuit-closer in the form of a relay magnet, 3, between the track rails and a third rail or ramp 4 paralleling the track rails, there being one such third rail or ramp connected to the circuit at each end of the block or section. These third rails are placed at suitable intervals along the track or wherever it is desired to obtain the desired signals and effect the automatic stopping of the train. On the locomotive I arrange two sets of signals, one set being utilized when there is a clear track, and the other set when the track is obstructed. Each set of signals is preferably composed of two members, one constant and the other intermittent in operation. I preferably use, for each set, two incandescent lamps, one being constantly lighted, and the other intermittently lighted. Following the usual custom, a clear track is indicated by green lights, and an obstructed track by red lights. In the drawings the continuous clear track light is indicated by a lamp at 5, and the intermittent clear track light by a lamp at 6, while the continuous danger light is indicated by a lamp at 7, and the intermittent danger light by a lamp at 8.

On the locomotive is mounted a brush or contact 9, which is shown in the form of a roller on a vertically-movable sliding member. In vertical alinement with this sliding member is the armature 10 of a relay magnet 12. I have shown this armature as having a slot through which a pivot pin 14 projects. The contact 9 is designed to engage with and be moved vertically by the rise in the third rail 4, and when free of said third rail the contact is returned to its normal position by gravity or springs, if desired. At its upper end armature 10 engages the handle of a control-valve 15 in the air line, the positions of the valve handle being indicated in Fig. 1. It is moved to service position, to apply the brakes, when armature 10 is moved vertically by the upward movement of brush or contact 9. When the train is running, the handle of an air-control valve 16 is caused to engage a contact to complete the connection between electromagnet 12 and the battery or generator 17. When brush or contact 9 is in its normal lowered position a closed circuit will be maintained through a terminal 18 carried thereby but insulated therefrom engaging a second terminal 19 on the car, the circuit when closed energizing a magnet 20 and holding its armature away from a contact 21 in the lamp circuit. The terminal 18 is connected by conductor $b$ to lead $y$ of the generator 17, and the terminal 19 is connected to the other lead $x$ through conductors $c$ and $d$, the latter being in circuit with car wheels 22. When the contact 9 is raised by a third rail and the circuit is broken through contacts 18 and 19, magnet 20 will be deënergized, and its armature being released will close the signal circuit at contact 21, allowing the intermittent danger signal to be operated in the event that the third rail is not electrified. Ordinarily, when there is a clear track, the moment contact 9 engages the third rail and before it is elevated thereby sufficiently to disengage contacts 18 and 19, the circuit is closed through conductor $e$, the car-wheels and conductor $d$, and magnet 12 is energized through conductors $f$, $f'$ and $e$, thereby drawing armature 10 out of the path of contact 9 and preventing the operation of air valve 15. At this time the circuit is closed through contact 9 to the third rail and through the armature of the relay magnet 3 to main rails and through vehicle wheels 22 to engine to which one pole of the generator is grounded. At the time the circuit through third rail is completed the current is shunted through conductor $e$ to a relay magnet 26 which being energized attracts armature 27 and closes the signal circuit through contact 28 to the intermittently-operated clear signal light 6, indicating to the engineer a clear roadway. The signal 6 continues to be displayed only as long as contact 9 is in engagement with the electrified third rail, and the circuit through magnets 12 and 26 is broken as soon as the contact 9 leaves the third rail. When these magnets are deënergized their armatures will resume their normal positions, the armature 27 then engaging a contact 29. When the track is clear and magnets 12 and 26 are energized, as above described, the current is also shunted through branch conductor $e^2$ to magnet 32, which is connected by conductor $h$ to the generator. The magnet 32 when energized attracts an armature 33 connected to conductor $h$ and holds it as long as contact 9 is in engagement with the third rail. When so attracted said armature will engage a contact 34 and through conductor $i$ will close the circuit through the continuous clear track signal 5, the said signal being connected by conductor $i$ to branch conductor $d'$, and at the same time the current is shunted through control-magnet 37 by conductor $j$, and this control-magnet, which is in close juxtaposition to magnet 32, continues to hold armature 33 in engagement with contact 34 even after the magnet 32 is deënergized, which latter occurs when contact 9 leaves the third rail. The circuit will continue to remain closed through clear track signal 5 until it is broken through magnet 37, and when this magnet is deënergized armature 33 will close the circuit through contact 35, the conductors $k$ $k'$ to continuous danger signal 7. The deënergizing of magnet 37 is effected by the energizing of a relay magnet 39, which acts only when intermittent danger signal 8 is displayed, and the energizing of the relay magnet 39 will occur when the circuit is closed at 21 consequent upon the separation of contacts 18 and 19 and the failure to close circuit through contact 9 and the track. When contact 9 engages rail 4, and at the same time the circuit through relay magnet 3 is closed, the relay magnet 26 will be energized and attract armature 27 to break the circuit through contact 29, and as this occurs just before contacts 18 and 19 become disengaged, the intermittent danger signal 8 is not displayed, the circuit thereto having been broken at 29. But if the circuit through relay magnet 3 is opened the circuit to relay magnet 26 will not be closed, and when the circuit is closed through contact 21, by the separation of contacts 18 and 19, circuit is established through armature 27 and contact 29, causing the intermittent danger signal to be displayed. The rail 4 must be energized to cause relay magnet 26 to be energized to prevent the operation of the intermittent danger signal and cause the display of the intermittent clear track signal. The relay magnet 39 is in a branch circuit in parallel with signal 8. The conductors $l$ and $o$ are connected to the armature of magnet 20, while the conductor $m$ is connected by conductor $n$ to contact 29. When relay magnet 39 is energized it attracts armature 45 thereby breaking the circuit through conductor $j$, and magnet 37, allowing the circuit to be closed through conductor $k$, and continuous danger signal 7 when armature 33 engages contact 35. Normally the circuit is closed through conductor $i$ by armature 33 being in engagement with contact 34 and the clear signal 5 remains constantly visible. When a third rail is encountered, and danger ahead has caused the circuit thereto to be broken through the deënergization of magnet 3, magnet 12 will not be energized, and in consequence armature 10 will remain in the path of and be engaged by the vertically movable contact 9, and upon being moved upwardly thereby will actuate valve 15 to effect the release of the air pressure in the train line and thereby cause the application of the brakes. The particular construction of the means employed for releasing the air pressure may be widely varied, and in connection therewith there may be employed means for automatically cutting off the steam simultaneously with the application of the brakes. I have thought it necessary to only indicate in a conventional way the air valves in the air line, and a connection between the latter and a cylinder 41, wherein when the air pressure is released, concurrently with the application of the brakes, a compression spring 42 will act on a piston 43 to effect the cutting off of the steam or source of power. When the track circuit is broken through relay magnet 3 magnets 12, 26 and 32, which are connected in multiple, will not be energized when contact 9 engages rail 4. The magnet 26 not being energized, the armature 27 will remain in engagement with contact 29, so that when the armature of relay magnet 20 is released upon the separation of contacts 18 and 19 the intermittent danger signal 8 will flash, and at the same time the current is shunted through relay 39, breaking circuit through conductor $j$ at contact 45, resulting in deënergizing control magnet 37 and allowing armature 33 to close the circuit through contact 35, the conductor $k$ to continuous danger signal 7, which latter continues to be displayed until a clear block or section is reached, whereupon relay magnet 32 will be again energized and the circuit broken through contact 35, thereby cutting out the continuous danger light 7, and reëstablishing the circuit through contacts 34 to throw in the continuous clear-track signal 5. It will be understood, of course, that when this occurs magnets 12 and 26 as well as magnet 32 are energized, thereby preventing the application of the brakes, and causing the temporary operation of the intermittent clear-track signal 6.

The circuit to operate the relay magnet 26 for clear track may be thus traced:— from generator 17, lead $x$, conductor $d$, car-wheels 22, track, circuit closer 3, ramp rail 4, contact 9, conductor $e$, relay magnet 26, branch conductor $e'$ to lead $y$. The circuit including the intermittent clear track signal 6 is branch conductor $d'$ extending from lead $x$, armature 27, contact 28, conductor $g$, lamp 6, conductor $g'$ and branch conductor $e'$ to lead $y$. The circuit in which the control magnet 12 is located includes conductor $f$ from lead $y$, handle of valve 16, conductor $f'$ and conductor $e$, contact 9, ramp rail 4, track, and wheels, and conductor $d$ to lead $x$. The circuit to magnet 32 includes conductor $d$ from lead $x$, track connection, ramp rail 4, contact 9, conductor $e$, branch conductor $e^2$, magnet 32, and conductor $h$ to lead $y$. The circuit to continuous signal 5 includes conductor $h$ from lead $y$, armature 33, contact 34, conductor $i$, light 5, conductor $i''$, and branch $d'$ to lead $x$. The circuit to control magnet 37 includes conductor $j$, from conductor $d$ of lead $x$, armature 45, magnet 37, conductor $i$, contact 34, armature 33, and conductor $h$ to lead $y$. The circuit for the intermittent danger signal 8 includes conductor $b$ from lead $y$, branch conductor $b'$, contact 21, the armature of magnet 20, conductor $o$, lamp 8, conductors $m$ and $n$, contact 29, armature 27, and branch conductor $d'$ to lead $x$. The circuit including relay magnet 39 may thus be traced:—conductors $b$, $b'$ from lead $y$, contact 21, armature of relay 20, conductor $l$, relay 39, conductors $m$, $n$, contact 29, armature 27, conductor $d'$ to lead $x$. The circuit to the continuous danger signal 7 includes conductor $h$ from lead $y$, armature 33, contact 35, conductor $k$, lamp 7, conductors $k'$ and $i''$, and branch $d'$ to lead $x$. The circuit embracing the contacts 18 and 19 includes conductor $b$ from lead $y$ and conductor $c$ through relay magnet 20 and conductor $d$ to lead $x$.

At any suitable point on the locomotive I locate a suitable governor 46, of any desired or preferred form of construction, and which is designed to be operated according to the speed of the engine, and preferably by belting or gearing driven by the engine wheels. To the vertically movable controlling rod 47 of the governor I connect a cross bar 55 which extends over a support 55$^a$ and carries a series of contact points which are designed to severally engage contact-bars 56, 57 and 58, which bars are of different lengths, and as the speed of the vehicle varies the contacts carried by the cross bar 55 will move back and forth over the contact bars 56, 57 and 58. These several fixed contact-bars are electrically connected, or designed so to be, through their respective contacts 59, 60, and 61, being engaged by armatures 62, 63 and 64 so mounted on the locomotive that depending portions thereof may engage with suitable projections 65 between the track rails. The engagement of these armatures with their respective projections brings them into the magnetic field of magnets 68, 69 and 70 which are normally energized, being included within a closed circuit, and upon an armature being drawn against its respective magnet it will close the circuit through its respective contact 59, 60 or 61. The several projections 65 are properly positioned in the roadway to respectively effect the actuation of a predetermined armature according to the speed of travel to which it is desired to reduce the train. These projections may be of any desired form of construction, and may be capable of being readily applied to the sleepers along the track wherever or whenever it is desired to automatically control or reduce the speed. When the latter is beyond the predetermined point, or the point sought to be maintained at any particular location, the speed of the governor will have moved the contact carrying bar 55 down over one or all of the fixed contact-bars, and when any one of the armatures is caused to engage its respective contact, a magnet 71 in circuit with the contact carrier 55 will be energized, causing its armature to disengage contact 72 so as to break the circuit through magnet 73. When the circuit is so broken through magnet 73 the armature 74 thereof will be drawn away from the magnet by a spring 75, thereby effecting the actuation of an air valve 76 in the air line, said armature constituting or being connected to the handle of said air valve, whereupon the action before described of applying the brakes and cutting off the steam supply will be repeated. As soon as the train has reduced its speed to or below the predetermined point the circuit is broken through the contact bar 55 being moved upwardly, consequent upon the decreased speed of the governor, and when the circuit is so broken, magnet 71 is deënergized and its armature reëngages contact 72, thereby closing the circuit through magnet 73, which acting upon armature 74 closes the air line, releasing the brakes and applying pressure on the steam controlling piston 43. The release of any one of the armatures 62, 63 and 64 from its respective magnet and contact is automatically effected by the energization of relay magnet 78, which breaks the circuit through the magnets of said armatures while contact 9 is in engagement with the third rail. This is occasioned by the opening of the circuit between contacts 18 and 19, and allowing it to be closed at contact 21 through the deënergizing of magnet 20. The several magnets 68, 69 and 70 are again energized as soon as the third rail has been passed. I have shown the armatures of these magnets in a conventional way, for purposes of illustration, but it is manifest that they may be differently arranged, and means different from that shown may be employed for effecting their movement. Preferably these armatures are in parallel planes and suitably spaced apart to correspond to the relative positions of the obstructions by which they are designed to be operated. Aside from the permanently located obstructions for operating the armatures for automatically controlling the speed, temporary obstructions may be positioned at any desired point. When the speed of the vehicle has been reduced to a predetermined rate, a contact 81, carried by the governor-controlled bar 55, will close the circuit through a contact 82, mounted on support 55ª. That portion of bar 55 upon which the contact 81 is mounted is insulated from the remaining portion of the bar, and the former is connected by a separate wire (not shown) to the opposite pole of the generator. The operator having placed the brakes in service position by turning the handle of valve 16 so that circuit will be closed between relay magnet 12 and contact 82ª, armature 10 will be drawn from the path of contact 9 and prevent the automatic stopping of the train by the engagement of the contact with a third rail while the train is traveling at the reduced speed.

At 85 I have indicated a shunt relay which will be energized and close the circuit through contact 86 as long as the train continues to run with the permanent danger signal 7 in circuit. When the circuit is closed through contact 86 contact bar 56 remains in circuit the same as if contact 59 thereof were engaged by armature 62. This prevents the vehicle from exceeding the predetermined speed as long as it continues to move with the danger signal in operation.

Although I have shown and described my invention in connection with what is designed to be a normally closed block or section, it is not to be restricted in this respect. The electric connections may be made through track switches, so that the latter will have to be closed before the circuit is closed, thereby preventing trains from running through open switches. My present invention may also be employed at railway crossings and arranged to prevent two trains from reaching a crossing at the same time.

The advantages of my invention will be appreciated by those skilled in the art. It will be observed that when a train reaches a block or section which has become short-circuited by the presence of another train the brakes will be automatically applied and the train brought to a stop by the cutting off of the steam supply. But independently of the stopping of the train, and what is of almost equal importance, the engineer is constantly reminded of the condition of the track by the signals both continuous and intermittent. As long as he is running over a clear track, lamp 5 will remain lighted, and light 6 will be intermittently lighted each time the contact of the locomotive engages a third rail which is in circuit with the main rail. But the moment such contact engages a third rail which is not in circuit with the main rail the continuous clear track light 5 will be extinguished and the two danger signals 7 and 8 will be lighted, signal 8 only while contact 9 remains in engagement with the third rail, but the continuous danger signal will remain lighted until the contact 9 again closes a circuit through a third rail. If contact 9 is destroyed or torn from the car the danger signal will be immediately lighted.

I claim as my invention:

1. In an automatic signal, the combination with a railway track having blocks or sections, and third rails adjacent to said blocks or sections, of a car having two separate sets of signals, each set comprising a continuous signal and an intermittently operated signal, separate operating means for the signal of each set, means carried by the car for engaging said third rails, means for actuating the operating means of one set of signals when said engaging means is in contact with the third rail, and means for retaining the continuous signal of such set in operation after said engaging means disengages such third rail.

2. In an automatic signal, the combination with a railway track having blocks or sections, and third rails electrically-connected to said blocks or sections, of a car having two separate sets of electrically-operated signals, each set comprising a continuous signal and an intermittently-operated signal, separate circuits for the signals of each set, means carried by the car for engaging said third rails, a source of electric energy connected to said engaging means, means for closing the circuits to one set of signals when said engaging means is in contact with a third rail, and means for retaining the continuous signal of such set in circuit after said engaging means disengages such third rail.

3. In an automatic signal, the combination with a railway track having blocks or sections, and third rails electrically-connected to said blocks or sections, of a car having two separate sets of electrically-operated signals, each set comprising a continuous signal and an intermittently-operated signal, separate circuits for the signals of each set, means carried by the car for engaging said third rails, a source of electric energy connected to said engaging means, means for maintaining the circuit closed to the continuous signal of one set of signals or the other, according as a block is clear or obstructed between third rails, and means for temporarily closing the circuit to the other signal of such set while said engaging means is in contact with a third rail.

4. In an automatic signal, the combination with a railway track having blocks or sections, and third rails electrically-connected to said blocks or sections, of a car having safety stopping means, a vertically-movable contact carried by the car and designed to engage the third rails, an element capable of being engaged by said contact to actuate said stopping means, an electric circuit comprising a magnet which when energized will move said element out of the path of said brush, two signals also carried by the car and capable of being energized, one at a time, and a relay magnet for controlling the circuits to said signals, both said magnets being energized when said contact is in electric engagement with a third rail, thereby moving said element out of the path of the contact and operating one of said signals, the other of said signals and said element being operated when the contact engages but is not energized by a third rail.

5. In an automatic signal, the combination with a railway track having blocks or sections, and third rails electrically-connected to said blocks or sections, of a car having two sets of signals, each set comprising two elements, an electric circuit, a relay magnet for temporarily controlling the current to one element of each set of signals, a second relay magnet for continuously controlling the current to the other element of each set of signals, and a third relay magnet for deënergizing the second magnet and shunting the current from one continuously controlled signal element to the other when the first-mentioned magnet is not energized.

6. In an automatic signal, the combination with a railway track having blocks or sections, and third rails electrically-connected to said blocks or sections, of a car having safety stopping means, a vertically-movable contact carried by the car and designed to engage the third rails, an element capable of being engaged by said contact to actuate said stopping means, an electric circuit comprising a magnet which when energized will move said element out of the path of said contact, two sets of signals, each set comprising two elements, a relay magnet for temporarily controlling the current to one element of each set of signals, a second relay magnet for continuously controlling the current to the other element of each set of signals, and a third relay magnet for deënergizing the second relay magnet and shunting the current from one continuously-controlled signal element to the other when the first mentioned magnet and the first mentioned relay are not energized.

7. In an automatic signal, the combination with a railway track having blocks or sections, and third rails electrically-connected to said blocks or sections, of a car having two sets of signals, each set comprising two elements, an electric circuit, a relay magnet for temporarily controlling the current to one element of each set of signals, two relay magnets for continuously controlling the current to the other element of each set of signals, one of the latter magnets being energized through the closing of the circuit through the other of said latter magnets, and a relay magnet for deënergizing the first mentioned of said latter magnets when the first mentioned relay magnet is not energized.

8. An automatic signal comprising two signals, an electric circuit having two branches, said signals being in said circuit, one in each branch thereof, two relay magnets, an armature operated by one relay magnet to shunt the current through one of said branches to one of said signals, the other of said magnets being thereby energized to hold said armature after the first mentioned relay magnet is deënergized, and a third relay magnet for deënergizing the other of said two relay magnets to allow said armature to shunt the current through the other of said branches, and means for energizing said third relay magnet.

9. An automatic signal comprising two signals, an electric circuit having two branches, said signals being in said circuit, one in each branch thereof, two relay magnets, an armature operated by one relay magnet to shunt the current through one of said branches to one of said signals, the other of said magnets being thereby energized to hold said armature after the first mentioned relay magnet is deënergized, and a third relay magnet for deënergizing the other of said two relay magnets to allow said armature to shunt the current through the other of said branches, two additional signals, and a fourth relay magnet for shunting the current from one of the last mentioned signals to the other, said third relay magnet being energized when the fourth mentioned relay magnet is deënergized.

In testimony whereof, I have signed this specification in the presence of two subscribing witnesses.

CARL L. POOL.

Witnesses:
J. NOTA McGILL,
FRANCIS S. MAGUIRE.